US006466258B1

(12) United States Patent
Mogenis et al.

(10) Patent No.: US 6,466,258 B1
(45) Date of Patent: Oct. 15, 2002

(54) 911 REAL TIME INFORMATION COMMUNICATION

(75) Inventors: Bronislaw Raymond Mogenis, Woodbridge, VA (US); Thomas Chandler Wellington, Gaithersburg; Matthew Foster Swayze, Rockville, both of MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/249,679

(22) Filed: Feb. 12, 1999

(51) Int. Cl.[7] .................................................. H04N 7/18
(52) U.S. Cl. ..................................................... 348/143
(58) Field of Search ............................. 348/13, 14, 15, 348/16, 17, 143, 148, 149, 150–155; H04N 7/18

(56) References Cited

U.S. PATENT DOCUMENTS

| 4,511,886 A | * | 4/1985 | Rodriguez ................... 328/152 |
| 4,777,526 A | * | 10/1988 | Saitoh et al. ............... 348/159 |
| 4,825,457 A | | 4/1989 | Lebowitz ..................... 379/40 |
| 5,012,335 A | | 4/1991 | Cottodar ...................... 358/108 |
| 5,027,104 A | | 6/1991 | Reid ........................... 340/541 |
| 5,144,661 A | * | 9/1992 | Shamosh et al. ............ 348/143 |
| 5,229,850 A | | 7/1993 | Toyoshima ................... 358/108 |
| 5,406,324 A | | 4/1995 | Roth ............................ 348/22 |
| 5,509,009 A | | 4/1996 | Laycock et al. ............... 370/62 |
| 5,521,634 A | | 5/1996 | McGary ...................... 348/169 |
| 5,546,072 A | | 8/1996 | Creuseremee et al. ....... 340/574 |
| 6,028,626 A | * | 2/2000 | Aviv ........................... 340/534 |
| 6,097,429 A | * | 8/2000 | Seelley et al. .............. 348/154 |

FOREIGN PATENT DOCUMENTS

EP          0 723 347 A1  *  7/1996    ............ H04J/14/02

* cited by examiner

Primary Examiner—Nhon Diep
(74) Attorney, Agent, or Firm—Duane Morris LLP

(57) ABSTRACT

A customer premise or site is fitted with cameras and other sensors. The sensors are interconnected with a central station, which monitors conditions. Upon occurrence of an emergency requiring dispatching of public safety officials to the site, the sensor information is routed to the responding units, so that they may monitor conditions within the site during travel, and upon and after arrival.

Various parameters of the sensors are controllable from the central station or the responding units.

6 Claims, 8 Drawing Sheets

Flow Diagram
(Customer Premise Perspective)

Flow Diagram
(Security/Tactical Control Center Perspective)

Continued on Fig. 4b

Flow Diagram
(Security/Tactical Control Center Perspective)

Flow Diagram
(Responding Unit Perspective)

Responding Unit                                                             Figure 6
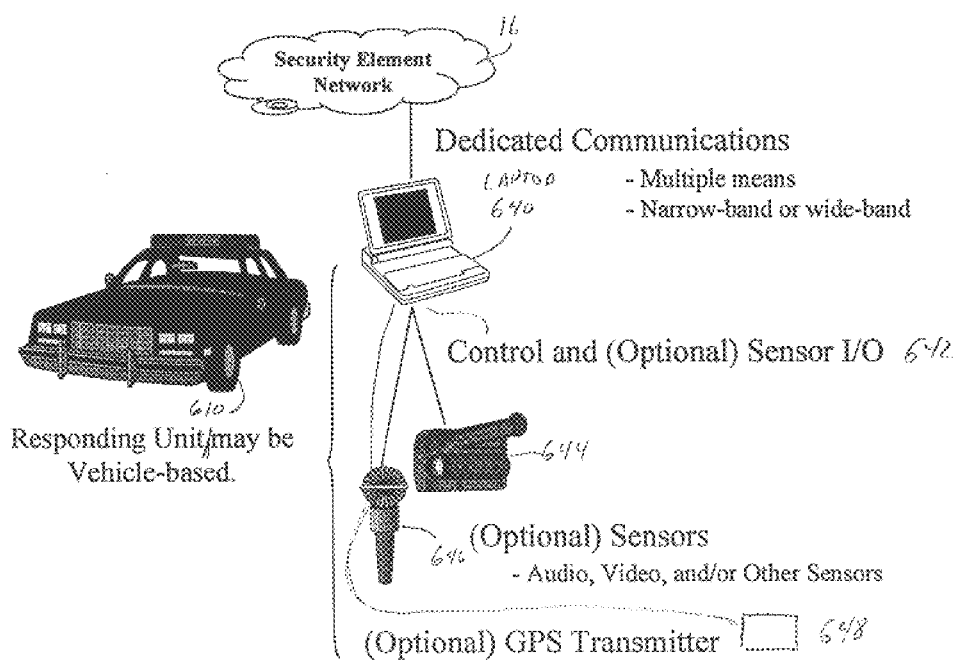

911 REAL TIME INFORMATION COMMUNICATION

FIELD OF THE INVENTION

This invention relates to an arrangement and method for providing communication between premises and emergency personnel responding to an emergency at the premises.

BACKGROUND OF THE INVENTION

Security and public safety officials often respond to emergency situations under conditions in which they know little or nothing of the nature of the emergency. among the factors which must be evaluated by the responding emergency personnel are, in the case of a crime, the number of suspected perpetrators, the type of armament, if any, whether there are hostages, location of a get-away vehicle, and the like. Time must be spent by the responding emergency personnel in becoming acquainted with the situation after their arrival on the scene, and some of that time may be spent on matters which are ultimately not needed. In those cases in which a person on the scene of the emergency is in telephonic contact with a Public Safety Answering Point (PSAP), which is the formal name for 911 dispatch centers, and the dispatcher is in radio contact with the emergency crew on its way to the scene, the emergency response personnel or crew may be advised moment-by-moment of the conditions at the scene, so that upon arrival, the crew may be immediately effective. The readiness and safety of the officials and of victims at the site of the emergency could be enhanced by a more effective arrangement for providing information.

SUMMARY OF THE INVENTION

A method for responding to an emergency according to an aspect of the invention includes the steps of, in response to a declaration of an emergency condition at a site, enabling a television camera previously located at the site, if the camera is not already enabled, to thereby generate video signals representative of the site. A signal representative of the declaration is transmitted to a central response location remote from the site; the signal is intended to alert operators at the central site. At the central response location, the signal representative of the declaration is responded to by coupling the video signals to the central response location, if it is not already coupled to the location. At the central response location, responding to the signal representative of the declaration by transmitting radio signals to at least one motorized emergency response person instructing the emergency response person to proceed to the site. This step of responding may be accomplished by way of an intermediary step, which may include sending a telephonic message to a Public Safety Access Point, which in turn transmits the radio signal. At the central response location, scene images are transmitted to the at least one motorized emergency response person by way of radio signals, whereby the emergency response person can view images of the scene before entering the scene. If appropriate, the last step can also be performed by way of the PSAP, or the central response location may itself be, or include the PSAP.

In order to aid in accomplishing the above function, an apparatus according to an aspect of the invention includes one or more television cameras located at a site which may be the scene of an emergency. The apparatus also includes an emergency declaration arrangement located at the site, for being enabled in response to indicia of an emergency, for generating electronic emergency declaration signals representative of an emergency condition at the site. Such an emergency declaration arrangement may be as simple an arrangement as a conventional "silent alarm" as presently used in banks or stores, or it may be an automatic alarm system which responds to glass breakage or the like. The apparatus further includes a central emergency response station, which as mentioned may include, or co-act with, a Public Safety Access Point. A first transmission arrangement is coupled to the emergency declaration arrangement, for transmitting the emergency declaration signals to the central emergency response station; this is a dedicated telephone line or cellular link, a telephone or cellular dialer which responds to the emergency declaration arrangement, a data path, or the like. The apparatus further includes an enabling arrangement for enabling the television camera in response to the emergency condition, if the television camera is not already enabled at the time the emergency condition arises, whereby the television camera produces video signals representative of the scene at which it is located, which at the relevant times is the site of an emergency. A coupling arrangement is coupled to the central emergency response station and to the television camera, for coupling the video signals from the television camera to the central emergency response station. This coupling arrangement may include video switches, processors, andor signal paths.

An electromagnetic radiation communication arrangement including a first portion located the central emergency response station and a second portion co-located with the emergency response person or vehicle, for communications between the central emergency response station and the emergency response person, for transmitting the video signals to the location of the emergency response person, and for display of a sequence of images of the scene of the emergency, as a result of which, or whereby, the emergency response person can view the images before, or concurrent with, entering the site of the emergency. Naturally, the emergency response person will ordinarily be in a vehicle which is initially at a location which is remote from both the emergency response station and from the site of the emergency. The emergency response person will drive the vehicle to the site of the emergency, and then leave the vehicle in order to address the emergency situation. The video path should extend not only to the vehicle, but also to the emergency person's communication device.

In a particular embodiment of the invention, the emergency declaration arrangement comprises a switching arrangement responsive to an automatic alarm system. In one embodiment, the electromagnetic radiation communication arrangement comprises a satellite link.

BRIEF DESCRIPTION OF THE DRAWING

FIG. 6 is a simplified representation of a responding unit.

DESCRIPTION OF THE INVENTION

Figure 1:
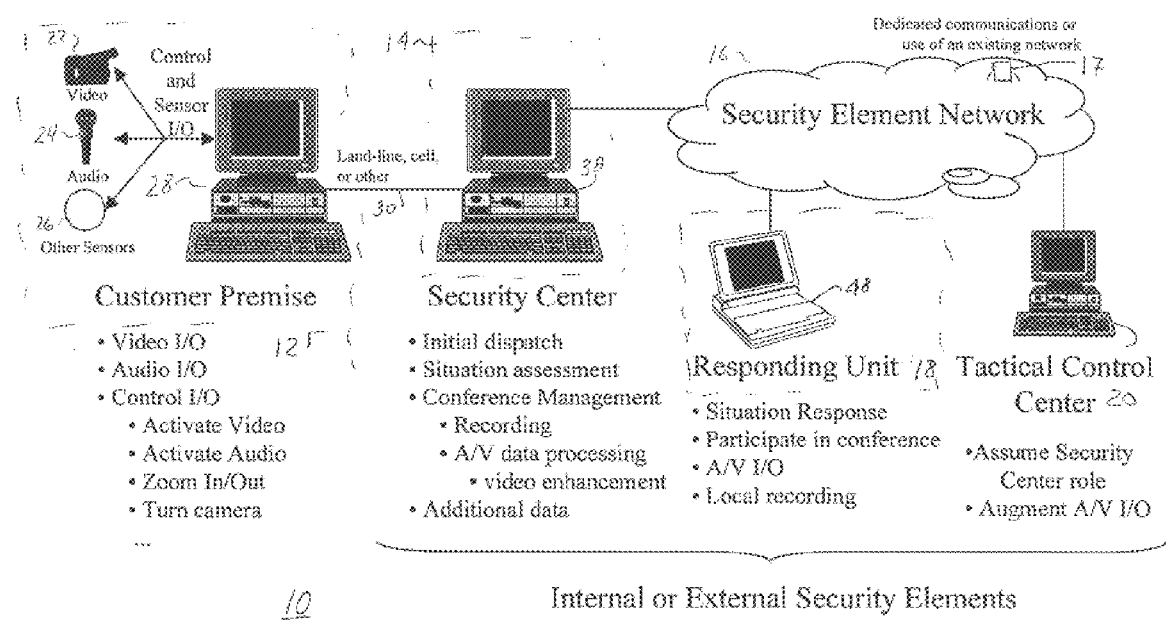
FIG. 1 is a simplified overall representation of a system apparatus according to an aspect of the invention.

FIG. 1 is a simplified overall representation of a system apparatus 10 according to an aspect of the invention. In FIG. 1, a customer premise is designated as 12. This customer premises 12 represent a location such as a bank, store, or other location which is to be protected in the manner described below. In the illustrated embodiment, the customer premises 12 include at least one camera or video source 22, at least one audio source such as a microphone 24, and other sensors, illustrated together as a circle 26. The audio and video sources, and the sensors, are all coupled to a controller 28, illustrated as a computer. The "other sensors" portion includes a "panic button," andor an automatic alarm system of the conventional sort, which responds to glass breakage, door opening, or the like, to effect closure of an electrical contact, to which the controller 28 may respond. Controller 28 is also connected by an additional signal path, illustrated as 30, with a security center 14, which is at a remote location relative to customer premises 12. Controller 28 receives the audio and video signals, and the sensor signals, and processes them according its programming, so as to respond to an emergency situation indicated by the sensors, or by command transmitted over signal path 30, by transmitting audio andor video information from customer premises 12 to security center 14. The transmission of the audio andor video information may be by way of signal path 30, or by some other path (not illustrated). Signal path 30 may be a dedicated transmission path extending from the customer premises 12 to security center 14, or it may be a path established by a dialer (not illustrated) through the public switched telephone network (PSTN) or a cellular system.

The programming of controller 28 at the customer premises 12 of FIG. 1 allows switching among the various video and audio sources upon receipt of appropriate commands from the security center, so that various ones of the sources can be accessed, either in a timed sequence, or upon individual selection. The cameras illustrated as 22 in FIG. 1 may include traversing or scanning devices which scan the scene being imaged around the camera location, so that various views can be observed. The cameras may also include controllable zoom lenses. The camera scanning devices andor zoom lenses should also be controllable in response to signals produced by controller 28. Such programming for controller 28 is generally known, and remote control of surveillance cameras is old.

Upon receipt of a declaration of an emergency at the customer premises 12 of FIG. 1, the security center 14 activates the video and audio sources, preferably automatically by means of a controller 38, illustrated as a computer, or by way of operator inputs. The declaration of the emergency may arrive by way of an appropriate signal over signal path 30, or it may arrive in some other manner, as by a telephoned warning from someone within or without the premises 12. A communication over path 30 is established in response to the declaration of emergency. The communication may be in accordance with H.323 or T.120 standards of the American National Standards Institute (ANSI). In response to the declaration of an emergency, the security center 14 immediately notifies the appropriate public safety officials. If security center 14 is a Public Safety Access Point, the notification may be by a radio message to a patrol car, by telephonic communication to a fire station, or the like. This notification may be made automatically by controller 38, or it may be performed manually by an operator.

At the present state of the art, the Public Safety Access Points are not equipped to accept information in a form other than that of speech. Thus, no response from the PSAP can be predicated upon a data message, such as an automated alarm system, or a data command from the controller 28 of FIG. 1. Thus, the present situation is one in which an automated alarm system must produce a speech signal for transmission to the PSAP. According to the invention, either the PSAP is equipped with data-processing or -handling equipment, or the security center 14 of FIG. 1 is an additional entity which is capable of processing data.

According to an aspect of the invention, the audio andor video information produced at the customer premises 12 of FIG. 1 and coupled over signal path 30 to the Security Center 14 is processed by the controller 38 in a fashion which transmits audio andor video information, as appropriate, over a network, illustrated as a security element network 16, to the responding unit illustrated as 18, which includes a bidirectional network accessing controller, illustrated as a laptop or notebook computer 48. The information may also be transmitted to other sites, one of which is illustrated as a tactical control center 20. The transmission of the data by way of the network 16 is accomplished using Advanced Mobile Phone Systems (AMPS) which uses Cellular Digital Packet Data (CDPD) protocol for routing the data. As an alternative, the data could be routed by way of the switched cellular system using a mobile Internet Protocol (IP), which is a software protocol that can transport and route itself through switching equipments. The responding unit will typically be mounted in a vehicle. Upon being apprised of an emergency situation at customer premises 12, which may be by way of a PSTN, or by way of the network 16 or by way of cellular telephone or a dedicated radio arrangement, the vehicle operator proceeds to the customer premises 12. The PSTN mode could be used in the case of an emergency response vehicle which is maintained at a fixed location, such as a fire truck at a fire station, or an ambulance at a garage. The abovementioned network, cellular telephone or dedicated radio all depend upon electromagnetic radiation, and can be used to reach a mobile site, namely an emergency response vehicle which is on patrol.

Concurrently with, or after the declaration of the emergency condition, the security center 14 of FIG. 1 processes the video andor audio information, if necessary, to compress the bandwidth of the information, and transmits it over the security element network 16. The bandwidth compression may be necessary for full-bandwidth sound, andor for transmission of a stream of video frames. In the case of transmission of stop-action frames of video, which are produced by some security cameras, the bandwidth may not need to be compressed in order to be accommodated by the network 16. The emergency response person(s) have the opportunity to view the video representing locations the customer site 12. According to an aspect of the invention, the emergency response personnel at the responding unit are able to select among the views which are available, by producing the appropriate keystrokes on their controller 48, and are also able to control the scanning of the cameras, and the zoom status of the lenses, so as to customize the views to their particular needs.

Figure 2:
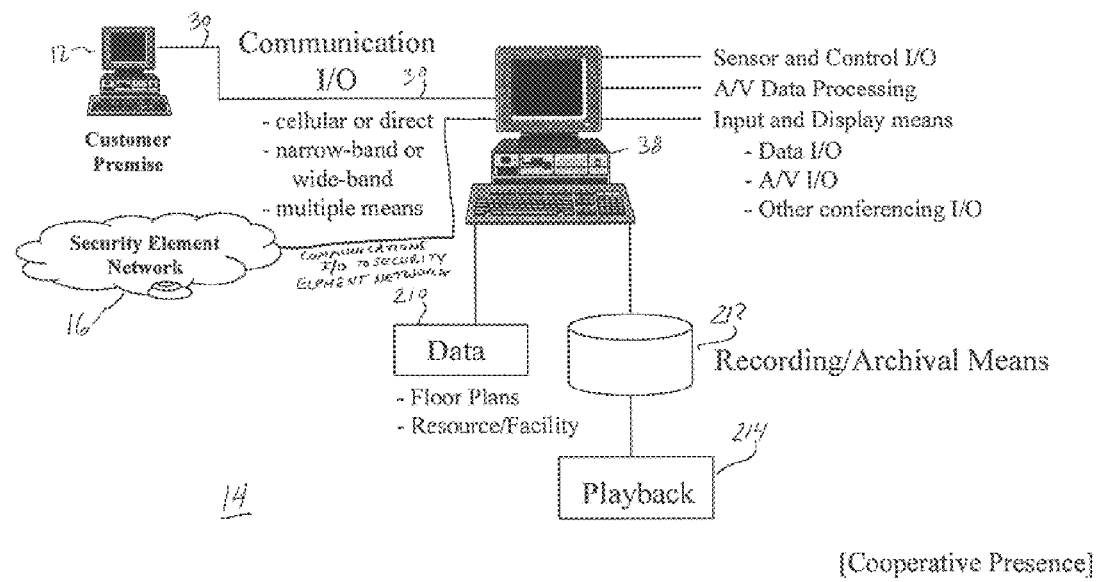
FIG. 2 is a simplified representation of an equipment assemblage and interconnection at a security center and/or tactical control center premises.

FIG. 2 is a simplified diagram of the arrangement of the security center 14 of FIG. 1. In FIG. 2, controller 38 receives data from customer premises 12 by way of signal path 30. Controller 38 is connected to a data source illustrated as a block 210, which includes such information as floor plans of, and resources available at, the customer premises 12. The data may be in the form of hard-copy plans which can be viewed by a camera, or the data may be in the form of a database loaded with equivalent information. Also, the security center 14 may include a recording or archiving database or memory 212, which automatically records the video, audio, and/or other sensor information arriving at center 14 for later use by the responding emergency party, if required, or for evaluation. A playback arrangement 214 is illustrated as being coupled to memory 212.

Figure 3:
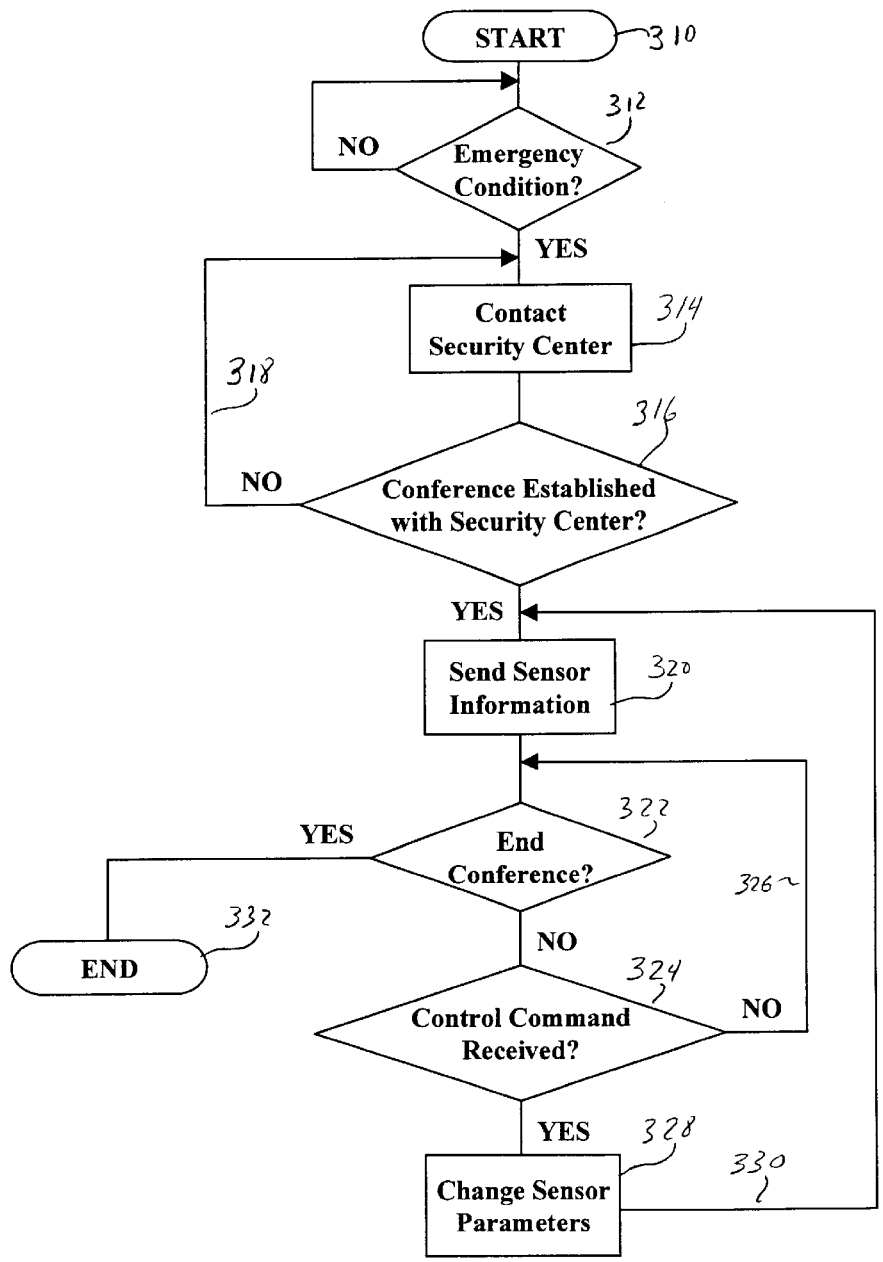
FIG. 3 is a simplified flow chart or diagram illustrating various steps according to an aspect of the invention, which are performed at the customer premises, which may include both computer steps and computer steps enhanced with human intervention.

FIG. 3 is a simplified flow diagram of the processing which may be performed by controller 28 at the customer premises 12 of FIG. 1. In FIG. 1, the logic starts at a START block 310, and proceeds to a logic decision block 312, which evaluates the current state of the signals from the alarm sensors andor external alarm source. So long as the condition is normal, which is to say the condition is not an emergency condition, the logic leaves decision block 312 by the NO output, and loops back to the input of decision block 312. The logic loops around decision block 312 until such time as an emergency condition is indicated, whereupon the logic exits decision block 312 by the YES path, and proceeds to a block 314, which represents contacting the security center (14 of FIG. 1) to attempt communication therewith. From block 314, the logic flows to a further decision block 316, which routes the logic by way of the NO output and a path 318 back to the input of block 314 so long as communication is not established. Eventually, the communication will be established, and the logic leaves decision block 316 by the YES output, and proceeds to a block 320, which represents the sending of sensor information to the security center 14 of FIG. 1. From block 320 of FIG. 3, the logic flows to a decision block 322, which routes the logic by way of its NO output to a decision block 324 so long as the communications or the conference are not ended. Decision block 324 examines incoming commands from the security center, to determine if a change in the sensor parameters is required. The sensor parameters may be the particular camera from among a plurality of cameras, the positioning of the particular camera to display the desired view, or the position (power or zoom value) of the zoom lens. The commands may also require switching among the various audio sources, or possibly a change in audio gain so as to detect whispers. If no such commands have been received, the logic leaves decision block 324 by way of the NO output and a logic path 326, and arrives back at the input of decision block 322. If a command is received to change a sensor parameter when the logic again reaches decision block 324, the logic leaves the decision block by way of the YES output, and arrives at a block 328. Block 328 represents the execution of the command to change a sensor parameter. From block 328, the logic returns by way of a logic path 330 to the input of block 320. The logic recurrently traverses to the NO output of decision block 322 until such time as a signal is received that communication is no longer desired, whereupon the logic leaves decision block 322 by the YES output, and flows to a STOP block 332.

Figure 4A:
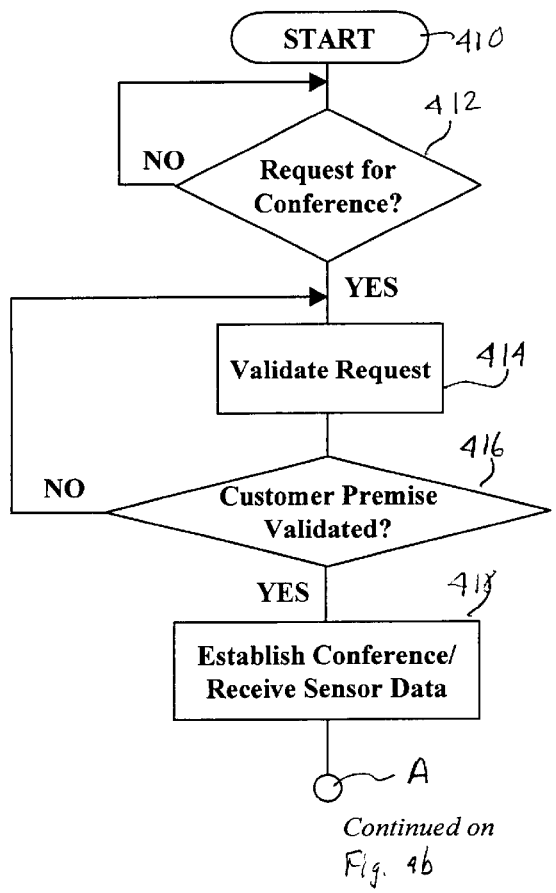
FIGS. 4a, 4b and 4c illustrate various steps performed at the security center and/or tactical control center, which may include both computer steps and computer steps enhanced with human intervention.
Figure 4B:
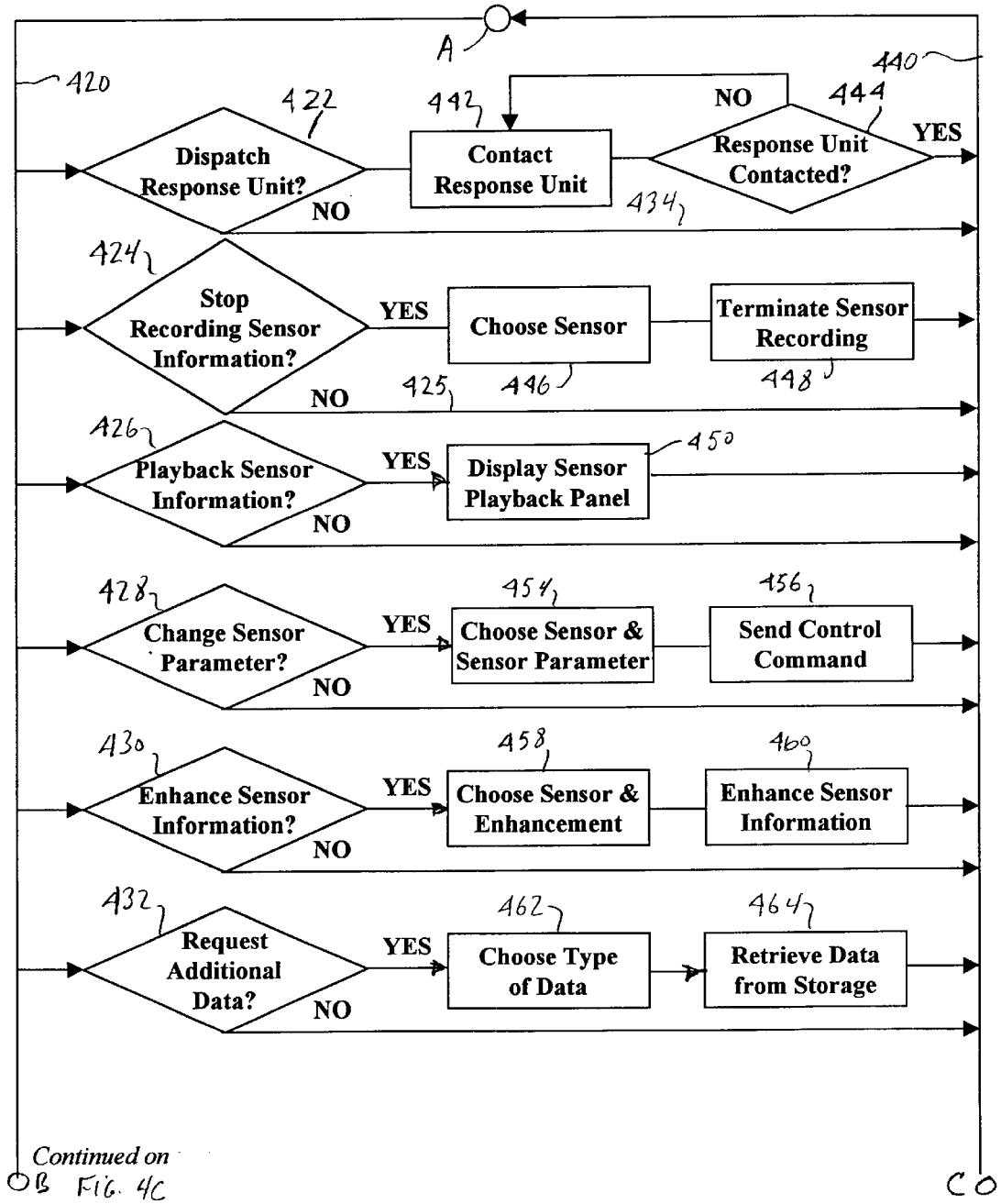
Figure 4C:
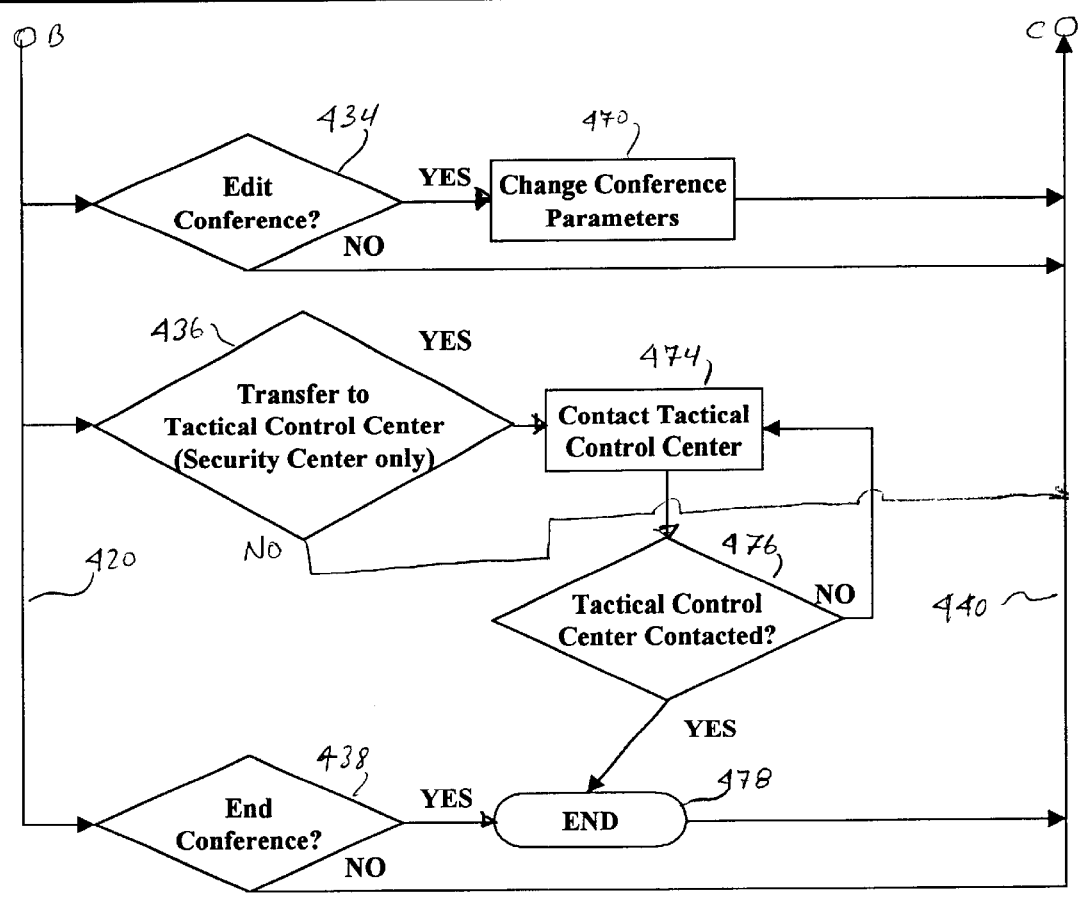

FIGS. 4a, 4b, and 4c together represent simplified logic flow diagram which can be used at the security center 14 of FIG. 1. In FIGS. 4a, 4b, and 4c, the logic starts at a START block 410, and proceeds to a decision block 412, which represents an evaluation as to whether a communication or conference is desired. If not, the logic leaves decision block 412 by the NO output, and loops back to the input of decision block 412. The logic continues to loop about decision block 412 until such time as a determination is made that communication is desired, in which case the logic leaves decision block 412 by the YES output, and arrives at a block 414, representing validation of the request for communication. Validation is accomplished by use of a password, authorized user ID, or authorized IP address. A decision block 416 routes the logic by way of its NO output back to block 414 if validation did not occur, or by way of its YES output if validation has occurred. From the YES output of decision block 416, the logic arrives at a block 418, which represents establishment of communication or a conference, and the receiving of sensor data. The logic flows by way of a logic node A and a path to inputs of decision blocks 422, 424, 426, 428, 430, and 432. Decision block 422 evaluates whether a response unit should be dispatched. While this may be performed automatically, so that if the fire sensor went off at the customer premises, the fire company should be called, and if the silent robbery alarm has been tripped, the police should be sent. However, due to the high false-alarm rate in public service calls, block 422 may include a human decision-maker. If no unit is to be dispatched, the logic leaves decision block 422 by the NO path and a further logic path 434, and returns by way of a logic path 440 to node A and to path 420. If a response unit is to be dispatched, then decision block 422 routes the logic flow by way of its YES output to a block 442, which represents an attempt to contact the appropriate response unit. Most public service agencies have an internal administrative process for deciding which response units to dispatch, and this internal procedure may be followed, or, if the response units are fitted with GPS equipment, the unit closest to the emergency location may be dispatched. The logic leaves block 442, and arrives at a decision block 444, which determines whether the response unit has been contacted or not. If the response unit has not been contacted, the logic leaves decision block 444 by the NO output, and returns to block 442. Eventually, contact will be made with the response unit, and the logic then leaves decision block 444 by the YES output, and arrives at path 440.

Decision block 424 of FIG. 4b makes a determination as to whether or not to stop recording sensor information. If stop recording has not been requested, the logic leaves decision block 424 by the NO path, and a further logic path 425, and returns by way of a logic path 440 to node A and to path 420. If stop recording has been requested, the logic leaves decision block 424 by the YES output, and arrives at logic block 446, which represents a list of sensors. Upon choosing a sensor to stop recording in logic block 446, the logic arrives at logic block 448, representing the turning off of recording for the sensor chosen in logic block 446. The logic then leaves decision block 448 and arrives at path 440.

The logic arriving at decision block 426 of FIG. 4b by way of logic node A and path 420 is routed by the YES output to a block 450 if sensor information is to be played back from memory 212 of FIG. 2. Block 450 represents display of a Playback Panel. the Playback Panel displays the date and time of the recording and provides the following control buttons to control the playback: Play, Stop, Rewind, and Fast Forward. The recorded data is routed from its storage location to the Security/Tactical Control Center via the Security Element Network. Upon reception of a command to cease playback, logic block 426 routes the logic to a block 452, representing termination of operation of the playback apparatus. From blocks 450 and 452, the logic returns to the decision blocks by way of logic path 440, logic node A, and logic path 420.

Sensors will be initially installed according to their optimal positioning, as determined by a site survey. However, during an emergency situation, a sensor's operating parameters may have to be manipulated to provide more accurate and clearer information, such as by zooming a camera lens or rotating a camera's field of view. If a sensor parameter change is requested, logic arriving at block 428 leaves via the YES path to the "Choose Sensor & Sensor Parameter" block 454, which represents a list of sensors at the Customer Premise and a list of parameters for those sensors. Upon choosing a sensor and a parameter change, logic moves to the "Send Control Command" block 456, which represents the transmission of the sensor parameter change to the sensor at the Customer Premise via the communications link 30 of FIGS. 1 and 2. If there is to be no change in the parameter, the logic leaves decision block 428 by the NO output, and flows back to node A by way of path 440.

It makes sense that some sensor information may be enhanced, such as filtering audio to block unwanted noise. If a sensor information enhancement is requested, logic moves from decision block 430 of FIG. 4b via the YES path to the "Choose Sensor & Enhancement" block 450, which represents a list of sensors at the Customer Premise and a list of sensor enhancements. Upon choosing a sensor and specifying the enhancement in block 438, logic moves to the "Enhance Sensor Information" block, which represents the manipulation of the sensor information according to the requested enhancement. From block 458, the logic returns to node A by way of path 440. If no enhancement is desired, the logic leaves decision block 430 by the NO output, and bypasses blocks 458 and 460.

Additional data about the Customer Premises, such as floor plans, may be stored. If additional data is requested, the logic flow through decision block 432 switches from the NO output to the YES output, which routes the logic through blocks 462 and 464, which represent presentation of a list of stored data relating to the Customer Premises, and transmission of a request for display of the selected data, respectively.

The logic flow from node A of FIG. 4b flows to node B of FIGS. 4b and 4c. Logic arriving at node B of FIG. 4c flows over path 420 and arrives at input ports of decision blocks 434, 436, and 438. Decision block 434 determines whether a command has been given to edit the conference. If no such command has been issued, the logic leaves decision block 434 by the NO output, and returns by way of path 440 to node A of FIG. 4b. If editing is commanded, the logic leaves decision block 434 by the YES path and arrives at a block 470, representing a change in conference parameters. From block 470, the logic returns to node A of FIG. 4b by way of path 440.

When the conference is eventually finished, the logic arriving at decision block 438 exits by the YES output, and arrives at an END block 478, which stops the processing at the security center. If the security center is transferring control of the processing to a tactical control center, the logic will include a decision block 416, which determines if a command has been issued to transfer control. If no command to transfer control has been given, the logic leaves decision block 436 by the NO output, and flows to return path 440. If a command has been given to transfer control, the logic leaves decision block 436 by the YES output, and arrives at a block 474, which represents contacting of the Tactical Control Center. From block 474, the logic flows to a further decision block 476, which returns the logic to block 474 if the Tactical Control Center has not been contacted. When the Tactical Control Center is eventually contacted and control is transferred, decision block 476 routes the logic by the YES output to END block 478.

Figure 5:
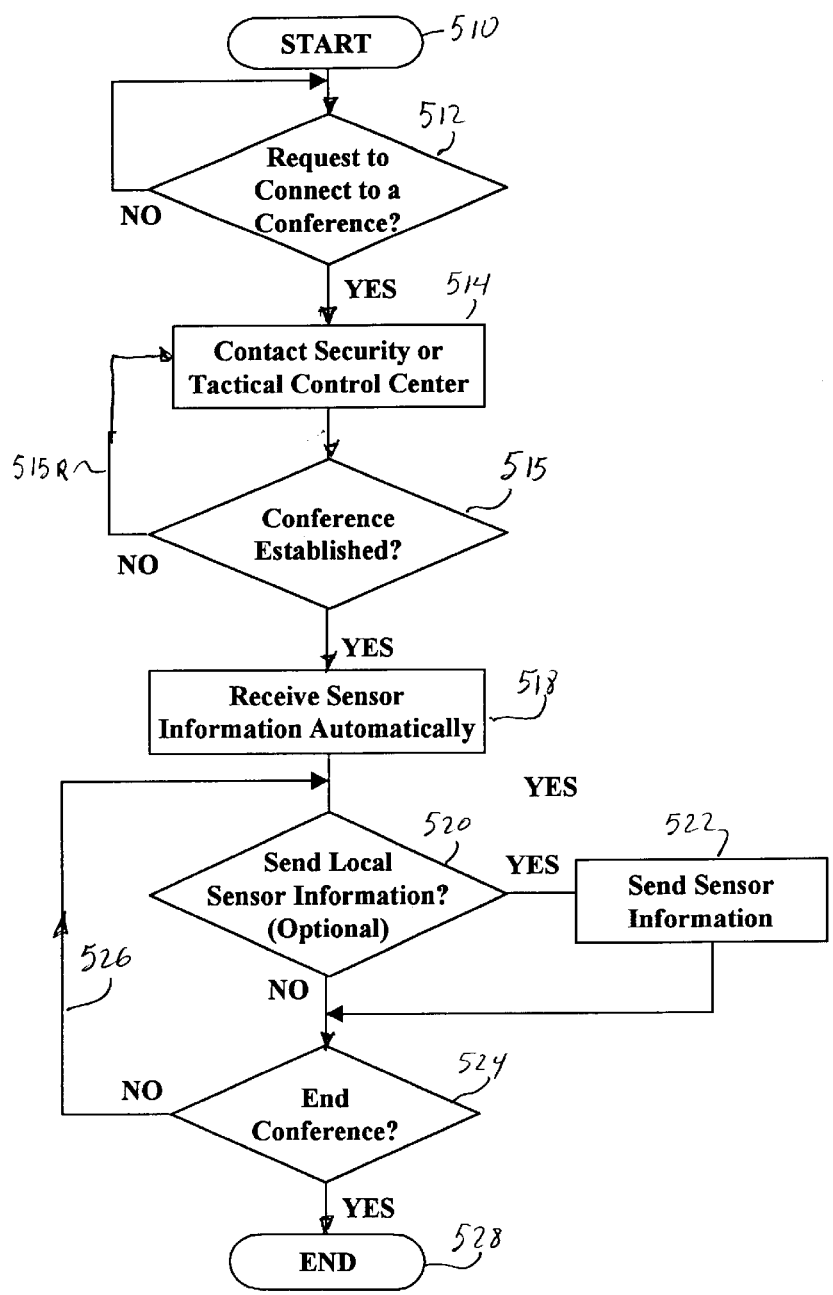
FIG. 5 is a simplified flow chart or diagram illustrating various computer or human-enhanced computer steps which are performed at the mobile or responding unit according to an aspect of the invention.

FIG. 5 is a simplified flow diagram of logic which may be used in the controller 48 of FIG. 1. In FIG. 5, the logic flow begins at a START block 510, and proceeds to a further logic decision block 512. Decision block 512 evaluates the presence or absence of a request for a conference and routes the logic by way of the NO output, by way of a logic path 514 back to the input of logic block 512 in the absence of a request for a conference. Eventually, a conference is requested, the logic exits from block 512 by the YES output, and proceeds to a block 514. Block 514 represents implementation of the command to contact the other party. From block 514, the logic flows to a decision block 515, which determines whether the conference has been established. So long as the conference has not been established, the logic loops from the NO output of decision block 515 back to block 514. Eventually, the conference is established, and the logic flows from the YES output of decision block 515 to block 518. Block 518 represents receiving and displaying sensor data. From block 518, the logic proceeds to a further decision block 520, which responds to a command to send local sensor data. If such a local transmission has been commanded, the logic leaves decision block 520 by the YES output, and proceeds to a block 522, which represents transmission of the sensor information. If no such command has been received, the logic exits decision block 520 by the NO output. Regardless of whether the logic leaves decision block 520 by the YES or NO output, the logic flow eventually arrives at a further decision block 524. Block 524 evaluates any command to terminate the conference or communication, and returns the logic flow by way of the NO output and a logic path 526 in the absence of such a command. If such a command is given, the logic exits decision block 524 by the YES output, and ends at an END block 528.

FIG. 6 represents a responding unit, which may include a vehicle 610. The vehicle is fitted with a dedicated data communications arrangement illustrated as a laptop computer 640, which communicates with security element network 16, and which also includes input/output (I/O) ports 642 for various controls, and for sensors, some of which are illustrated as a video camera 644 and a microphone 646. A GPS receiver/transmitter illustrated as a block 648 may also be among the sensors.

Other embodiments of the invention will be apparent to those skilled in the art. For example, while, in the above description, the cellular system is an alternative to the cellular system, the dialer may be arranged to attempt to use the PSTN to first establish communication between the customer premise 12 and the security center 14, and in case of failure or slow response, to then attempt communication by way of a terrestrial or spacecraft-based cellular system. Those skilled in the art of digital communications know that the signal paths for such communication may be serial or parallel, and that conversions between serial and parallel form may be made at various locations as required. In the context of communication system inventions such as the present invention, the term "between" does not have a meaning related to relative physical location, but instead identifies terminals of the communication or signal path; the communication path may of course include terminals or stations other than those listed in conjunction with "between." While a terrestrial network 16 has been described, the network may also include a spacecraft repeater, illustrated as 17 in FIG. 1.

Thus, a method for responding to an emergency according to an aspect of the invention includes the steps of, in response to a declaration of an emergency condition at a site, enabling a television camera previously located at the site, if the camera is not already enabled, to thereby generate video signals representative of the site. A signal representative of the declaration is transmitted to a central response location remote from the site; the signal is intended to alert operators at the central site. At the central response location, the signal representative of the declaration is responded to by coupling the video signals to the central response location, if it is not already coupled to the location. At the central response location, responding to the signal representative of the declaration by transmitting radio signals to at least one motorized emergency response person instructing the emergency response person to proceed to the site. This step of responding may be accomplished by way of an intermediary step, which may include sending a telephonic message to a Public Safety Access Point, which in turn transmits the radio signal. At the central response location, scene images are transmitted to the at least one motorized emergency response person by way of radio signals, whereby the emergency response person can view images of the scene before entering the scene. If appropriate, the last step can also be performed by way of the PSAP, or the central response location may itself be, or include the PSAP.

In order to aid in accomplishing the above function, an apparatus (10) according to an aspect of the invention includes one or more television cameras (22) located at a site (12) which may be the scene of an emergency. The apparatus (10) also includes an emergency declaration arrangement (26) located at the site (12), for being enabled in response to indicia of an emergency, for generating electronic emergency declaration signals representative of an emergency condition at the site (12). Such an emergency declaration arrangement (26) may be as simple an arrangement as a conventional "silent alarm" as presently used in banks or stores, or it may be an automatic alarm system which responds to glass breakage or the like. The apparatus (10) further includes a central emergency response station (14), which as mentioned may include, or co-act with, a Public Safety Access Point. A first transmission arrangement is coupled to the emergency declaration arrangement (26), for transmitting the emergency declaration signals to the central emergency response station (14); this is a dedicated telephone line or cellular link, a telephone or cellular dialer which responds to the emergency declaration arrangement (26), a data path, or the like. The apparatus (10) further includes an enabling arrangement (320) for enabling the television camera (22) in response to the emergency condition, if the television camera (22) is not already enabled at the time the emergency condition arises, whereby the television camera (22) produces video signals representative of the scene at which it is located, which at the relevant times is the site (12) of an emergency. A coupling arrangement (30) is coupled to the central emergency response station (14) and to the television camera (22), for coupling the video signals from the television camera (22) to the central emergency response station (14). This coupling arrangement may include video switches, processors, andor signal paths. The invention contemplates that at least one emergency response person or officer is at an initial location which is remote from both the central emergency response station (14) and from the site (12). The apparatus of the invention includes an electromagnetic radiation communication arrangement (at least a portion of network 16) including a first portion coupled to the central emergency response station (14) and a second portion co-located with the emergency response person or vehicle (18), for communications between the central emergency response station (14) and the emergency response person (18), for transmitting the video signals to the location of the emergency response person, and for display (on the screen of laptop computer 48) of a sequence of images of the scene of the emergency, as a result of which, or whereby, the emergency response person can view the images before, or concurrent with, entering the site (12) of the emergency. Naturally, the emergency response person will ordinarily be in a vehicle (18) which is initially at a location which is remote from both the security center (14) and from the site (12) of the emergency. The emergency response person will drive the vehicle (18) to the site (12) of the emergency, and then leave the vehicle (18) in order to address the emergency situation. The video path should extend not only to the vehicle (18), but also to the emergency person's communication device. In the described system, the laptop device 48 is portable, and can be taken from the vehicle by the emergency person.

In a particular embodiment of the invention, the emergency declaration arrangement (26) comprises a switching arrangement responsive to an automatic alarm system. In one embodiment, the electromagnetic radiation communication arrangement (at least a portion of network 16) comprises a satellite link.

What is claimed is:

1. A method for responding to an emergency, comprising the steps of:

in response to a declaration of an emergency condition at a site, enabling a television camera previously located at said site, if said camera is not already enabled, to thereby generate video signals representative of said site;

transmitting a signal representative of said declaration to a central response location remote from said site;

at said central response location, responding to said signal representative of said declaration by coupling said video signals to said central response location;

at said central response location, responding to said signal representative of said declaration by transmitting radio signals to at least one motorized emergency response person instructing said emergency response person to proceed to said site; and at said central response location, responding to said signal representative of said declaration by transmitting scene images to said at least one motorized emergency response person by way of radio signals, whereby said images of said scene are available to emergency response personnel before entering said scene.

2. Apparatus, comprising:

a television camera located at a site which is the scene of an emergency;

emergency declaration means located at said site, for being enabled in response to indicia of an emergency, for generating electronic emergency declaration signals representative of an emergency condition at said site;

a central emergency response station;

first transmission means coupled to said emergency declaration means, for transmitting said emergency declaration signals to said central emergency response station;

means for enabling said television camera in response to said emergency condition, if said television camera is not already enabled at the time said emergency condition arises, whereby said television camera produces video signals representative of a scene at said site of said emergency;

means coupled to said central emergency response station and to said television camera for coupling said video signals from said television camera to said central emergency response station;

at least one emergency response person at an initial location remote from both said central emergency response station and from said site;

electromagnetic radiation communication means including a first portion located said central emergency response station and a second portion co-located with said emergency response person, for communications between said central emergency response station and said emergency response person, for transmitting said video signals to said location of said emergency response person, and for display of a sequence of images of said scene of said emergency, whereby said emergency response person can view said images before entering said site of said emergency.

3. An apparatus according to claim 2, wherein said emergency declaration means comprises a manually operable emergency switch.

4. An apparatus according to claim 2, wherein said emergency declaration means comprises switching means responsive to an automatic alarm system.

5. An apparatus according to claim 2, wherein said first transmission means comprises a telephone dialing apparatus.

6. An apparatus according to claim 2, wherein said electromagnetic radiation communication means comprises a satellite link.

* * * * *